US012810170B2

(12) United States Patent
Lee et al.

(10) Patent No.: US 12,810,170 B2
(45) Date of Patent: Nov. 24, 2026

(54) METHOD FOR PREDICTING REMAINING LIFE OF INDUSTRIAL FACILITY USING GENERATIVE ADVERSARIAL NETWORK, AND APPARATUS THEREOF

(71) Applicant: HL MANDO CORPORATION, Gyeonggi-do (KR)

(72) Inventors: Doheon Lee, Seoul (KR); Gyuwon Kim, Gyeonggi-do (KR)

(73) Assignee: HL MANDO CORPORATION, Gyeonggi-do (KR)

( * ) Notice: Subject to any disclaimer, the term of this patent is extended or adjusted under 35 U.S.C. 154(b) by 711 days.

(21) Appl. No.: 18/208,884

(22) Filed: Jun. 13, 2023

(65) Prior Publication Data

US 2024/0354587 A1 Oct. 24, 2024

(30) Foreign Application Priority Data

Apr. 18, 2023 (KR) ........................ 10-2023-0050673

(51) Int. Cl.
*G06N 3/094* (2023.01)
*G06N 3/0475* (2023.01)

(52) U.S. Cl.
CPC ........... *G06N 3/094* (2023.01); *G06N 3/0475* (2023.01)

(58) Field of Classification Search
CPC ............................. G06N 3/094; G06N 3/0475
See application file for complete search history.

(56) References Cited

U.S. PATENT DOCUMENTS

2012/0296606 A1* 11/2012 Hamzaoui ............ G05B 19/401 702/184
2019/0042948 A1* 2/2019 Lee ..................... G06F 7/49947
2020/0013156 A1* 1/2020 Weiss ..................... G06T 7/0004
2020/0110181 A1* 4/2020 Lu ...................... G05B 23/0243
2020/0210773 A1* 7/2020 Li .......................... G06N 3/047
2021/0055719 A1* 2/2021 Zheng .................... G06N 3/045
2023/0086049 A1* 3/2023 Rakuff ................... G06N 5/022 702/34
2023/0104028 A1* 4/2023 Wang ................. G05B 23/0283 702/183
2023/0281439 A1* 9/2023 Maher .................... G06N 3/044 706/16
2023/0316066 A1* 10/2023 Jiang .................... G06N 3/0475 706/12
2024/0320486 A1* 9/2024 Li ............................ G06N 3/08
2025/0021089 A1* 1/2025 Ma .......................... G06F 30/27
2025/0348062 A1* 11/2025 Jain .................... G05B 19/4184

* cited by examiner

*Primary Examiner* — Jeremy L Stanley
(74) *Attorney, Agent, or Firm* — WOMBLE BOND DICKINSON (US) LLP

(57) ABSTRACT

The present disclosure provides a method performed by a facility control device to predict a remaining life of an industrial facility using a generate adversarial network, and the method includes acquiring normal process data from at least one or more industrial facilities, preprocessing and generating the normal process data and discrete data as learning data, learning the generative adversarial network based on the preprocessed learning data, and inputting the data obtained from the industrial facility into the pre-learned generative adversarial network and predicting the remaining life of the industrial facility based on output data output from the generative adversarial network. Moreover, the present disclosure provides an apparatus for predicting a remaining life of an industrial facility using the generative adversarial network.

15 Claims, 6 Drawing Sheets

METHOD FOR PREDICTING REMAINING LIFE OF INDUSTRIAL FACILITY USING GENERATIVE ADVERSARIAL NETWORK, AND APPARATUS THEREOF

TECHNICAL FIELD

The present disclosure relates to a method and apparatus for predicting a remaining life of an industrial facility through a generative adversarial network, and more particularly, a method and apparatus for predicting a remaining life of an industrial facility by comparing normal process data obtained from an industrial facility with output data generated from a generative adversarial network and transmitting maintenance information about the industrial facility.

BACKGROUND

For tangible fixed assets, such as manufacturing equipment, a decline in a value of the facility over time is called depreciation.

This depreciation is divided into accounting depreciation and economic depreciation. The accounting depreciation is an accounting system that distributes the value of tangible fixed assets excluding the residual value during the estimated useful life in a systematic and rational way.

However, while depreciation for a given year adequately accounts for possible occurrences in the system total under consideration, the depreciation cannot effectively measure all possible occurrences.

Therefore, the more accurately a remaining life of an industrial facility such as a manufacturing facility can be predicted and calculated more accurately, the more effective the valuation system can be built by companies operating using the manufacturing facility.

Accordingly, while a deep learning technology is rapidly developing, there is an active discussion about technology development that predicts and calculates the remaining life of an industrial facility by utilizing the deep learning technology.

The above-mentioned background art is technical information that the inventor possessed for derivation of the present disclosure or obtained in the course of derivation of the present disclosure, and cannot necessarily be said to be a technology known to the general public prior to filing the present disclosure.

SUMMARY

The task to be solved through the disclosure of the present disclosure is a method and apparatus capable of actively using a deep learning algorithm using a generative adversarial network to predict a remaining life of an industrial facility and preparing for the remaining life.

In addition, the problem to be solved through the disclosure of the present disclosure is to provide a more efficient deep learning algorithm by utilizing discrete data in a process of learning the generative adversarial network.

In addition, the problem to be solved through the disclosure of the present disclosure is to predict the remaining life of the industrial facility and to provide information for maintaining or replacing the industrial facility according to the predicted result.

According to an aspect of the present disclosure, there is provided a method performed by a facility control device to predict a remaining life of an industrial facility using a generate adversarial network, the method including: acquiring normal process data from at least one or more industrial facilities; preprocessing and generating the normal process data and discrete data as learning data; learning the generative adversarial network based on the preprocessed learning data; and inputting the data obtained from the industrial facility into the pre-learned generative adversarial network and predicting the remaining life of the industrial facility based on output data output from the generative adversarial network.

In the aspect, the generative adversarial network may include a generator that generates the normal process data when the data obtained from industrial facility is input.

In the aspect, the generative adversarial network may calculate a difference between the normal process data generated by the generator and the learning data.

In the aspect, the discrete data may include the average number of pressing forces utilized by at least one or more industrial facilities and data on the number of uses of the industrial facility.

In the aspect, the generative adversarial network may include a label embedding layer that converts a data value of the discrete data into a weight applied to a feature map channel.

In the aspect, the inputting of the data obtained from the industrial facility into the pre-learned generative adversarial network and predicting the remaining life of the industrial facility based on output data output from the generative adversarial network may further include transmitting an inspection signal of at least one industrial facility based on the remaining life.

In the aspect, the inputting of the data obtained from the industrial facility into the pre-learned generative adversarial network and predicting the remaining life of the industrial facility based on output data output from the generative adversarial network may further include industrial facility maintenance information based on the remaining life.

In the aspect, an inspection signal transmission period of the industrial facility may be set based on a difference value between the normal process data and the input data generated by the generator in the generative adversarial network.

According to the aspects of the present disclosure, it is possible to provide a method and an apparatus for predicting the remaining life of the industrial facility and preparing for the remaining life by actively using deep learning algorithm using the generative adversarial network.

In addition, according to the aspects of the present disclosure, it is possible to provide a more efficient deep learning algorithm by utilizing the discrete data in a process of learning the generative adversarial network.

In addition, according to the aspects, it is possible to predict the remaining life of the industrial facility, and to provide information for maintaining or replacing an industrial facility more quickly and conveniently according to the predicted result.

DETAILED DESCRIPTION

Figure 1:
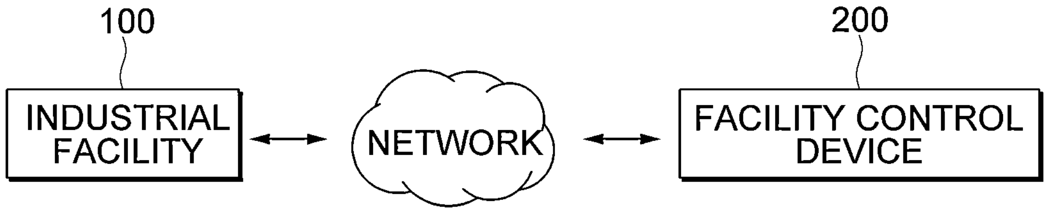
FIG. 1 illustrates an exemplary environment to which a facility control device according to some embodiments of the present disclosure may be applied.

Hereinafter, preferred embodiments of the present disclosure will be described in detail with reference to the accompanying drawings. Advantages and features of the present disclosure, and methods of achieving them, will become clear with reference to the embodiments described below in detail in conjunction with the accompanying drawings. However, the technical idea of the present disclosure is not limited to the following embodiments and can be implemented in various different forms. The following embodiments are merely provided to complete the technical spirit of the present disclosure and to completely inform those skilled in the art of the scope of the present disclosure, to which the present disclosure belongs, and the technical spirit of the present disclosure is only defined by the scope of the claims.

In adding reference numerals to components of each drawing, it should be noted that the same components have the same numerals as much as possible even if they are displayed on different drawings. In addition, in describing the present disclosure, when it is determined that a detailed description of a related known configuration or function may obscure the gist of the present disclosure, the detailed description will be omitted.

Unless otherwise defined, all terms (including technical and scientific terms) used in this specification may be used with meanings commonly understood by those of ordinary skill in the art to which this disclosure belongs. In addition, terms defined in commonly used dictionaries are not interpreted ideally or excessively unless explicitly specifically defined. Terminology used herein is for describing the embodiments and is not intended to limit the present disclosure. In this specification, singular forms also include plural forms unless specifically stated otherwise in a phrase.

Moreover, terms such as first, second, A, B, (a), and (b) may be used in describing the components of the present disclosure. These terms are only used to distinguish the component from other components, and the nature, order, or order of the corresponding component is not limited by the term. When a component is described as being "connected," "coupled," or "connected" to another component, the component may be directly connected or joined to the other component, but it should be understood that another component may be "connected", "coupled" or "joined" between the components.

As used herein, "comprises" and/or "comprising" means that a stated component, step, operation, and/or component does not rule out the presence or addition of one or more other components, steps, operations, and/or components.

Hereinafter, various embodiments of the present disclosure will be described in detail with reference to the accompanying drawings.

In addition, in describing the components of the present disclosure, terms such as first, second, A, B, (a), and (b) may be used. These terms are only used to distinguish the component from other components, and the nature, sequence, or order of the corresponding component is not limited by the term. Throughout the specification, when a part "includes" or "has" a certain component, it means that it may further include other components without excluding other components unless otherwise stated. Moreover, terms such as "unit" and "module" described in the specification refer to a unit that processes at least one function or operation, and may be implemented by hardware, software, or a combination of hardware and software.

FIG. 1 illustrates an exemplary environment to which a facility control device according to some embodiments of the present disclosure may be applied. Through a system including an industrial facility 100 and a facility control device 200 illustrated in FIG. 1, normal process data generated in the industrial facility 100 is obtained, a generative adversarial network including the facility control device 200 is learned, and thus, it is possible to predict a remaining life of the industrial facility.

Hereinafter, operations of the components illustrated in FIG. 1 related to an operation of predicting the remaining life of the industrial facility 100 through the above-described system will be described in more detail.

FIG. 1 illustrates an example in which the industrial facility 100 and the facility control device 200 are connected through a network, but this is only for convenience of understanding, and the number of devices that can be connected to the network may be changed.

Meanwhile, FIG. 1 only illustrates a preferred embodiment for achieving the object of the present disclosure, and some components may be added or deleted as necessary. Hereinafter, the components illustrated in FIG. 1 will be described in more detail.

The facility control device 200 may call information on the industrial facility 100 and predict the remaining life of the industrial facility 100. Here, the facility control device 200 may collect and analyze various information generated in the industrial facility 100.

Various information may include all data generated in the industrial facility 100, for example, vibration data and voice data generated in the industrial facility 100, may be specifications of the industrial facility itself, and may be information about a process environment in which the industrial facility 100 is installed. This information may be information collected by utilizing a series of devices in the industrial facility 100, and it is natural that the series of devices may include all electronic devices that the industrial facility 100 has from the point of view of a technician having ordinary knowledge.

An industrial facility 100 illustrated in FIG. 1 means mechanical and electronic devices in an industrial process, and means a mechanical device necessary in an industrial process to the extent that a person skilled in the art can understand in the industrial process.

Meanwhile, the facility control device 200 may be implemented with one or more computing devices. For example, all functions of the facility control device 200 may be implemented with a single computing device. As another example, a first function of the facility control device 200 may be implemented with a first computing device, and a second function thereof may be implemented with a second computing device. Here, the computing device may be a notebook, a desktop, or a laptop, but is not limited thereto and may include any type of device equipped with a computing function. However, it may be preferable that the facility control device 200 be implemented as a high-performance server-class computing device. An example of a computing device will be described with reference to FIG. 6.

In addition, functions that can additionally be implemented by the facility control device 200 may be implemented by utilizing electronic devices mounted in the industrial facility 100. Therefore, in FIG. 1, the facility control device 200 and the industrial facility 100 are illustrated separately, but according to one embodiment, it is natural that the facility control device 200 is mounted in the industrial facility 100 so that the facility control device 200 can implement the first function and the second function within the industrial facility 100. Therefore, as illustrated in FIG. 1, it should be noted that the interpretation is not limited to one embodiment in which the industrial facility 100 and the facility control device 200 are externally separated.

In this specification, for convenience of description, a situation in which the industrial facility 100 and the facility control device 200 are separated to implement functions will be described.

In some embodiments, components included in the environment to which the facility control device 200 is applied may communicate through a network. The network may be implemented as all types of wired/wireless networks such as a Local Area Network (LAN), a Wide Area Network (WAN), a mobile radio communication network, and Wibro (Wireless Broadband Internet).

Meanwhile, the environment illustrated in FIG. 1 illustrates that the industrial facility 100 is connected through a network via the facility control device 200, but the scope of the present disclosure is not limited thereto, and it should be noted that the industrial facility 100 may be connected to the facility control device 200 through Peer to Peer (P2P).

So far, with reference to FIG. 1, an exemplary environment to which the facility control device 200 according to some embodiments of the present disclosure can be applied has been described. Hereinafter, methods according to various embodiments of the present disclosure will be described in detail with reference to the drawings below in FIG. 2.

Each step of the methods described below may be performed by a computing device. In other words, each step of the methods may be implemented as one or more instructions executed by a processor of a computing device. All of the steps involved in these methods could be performed by one physical computing device, but first steps of the method may be performed by the first computing device and second steps of the method may be performed by the second computing device.

Hereinafter, in FIG. 2, description will be continued on the assumption that each step of the methods is performed by the facility control device 200 illustrated in FIG. 1. However, for convenience of description, the description of the subject of operation of each step included in the methods may be omitted.

Figure 2:
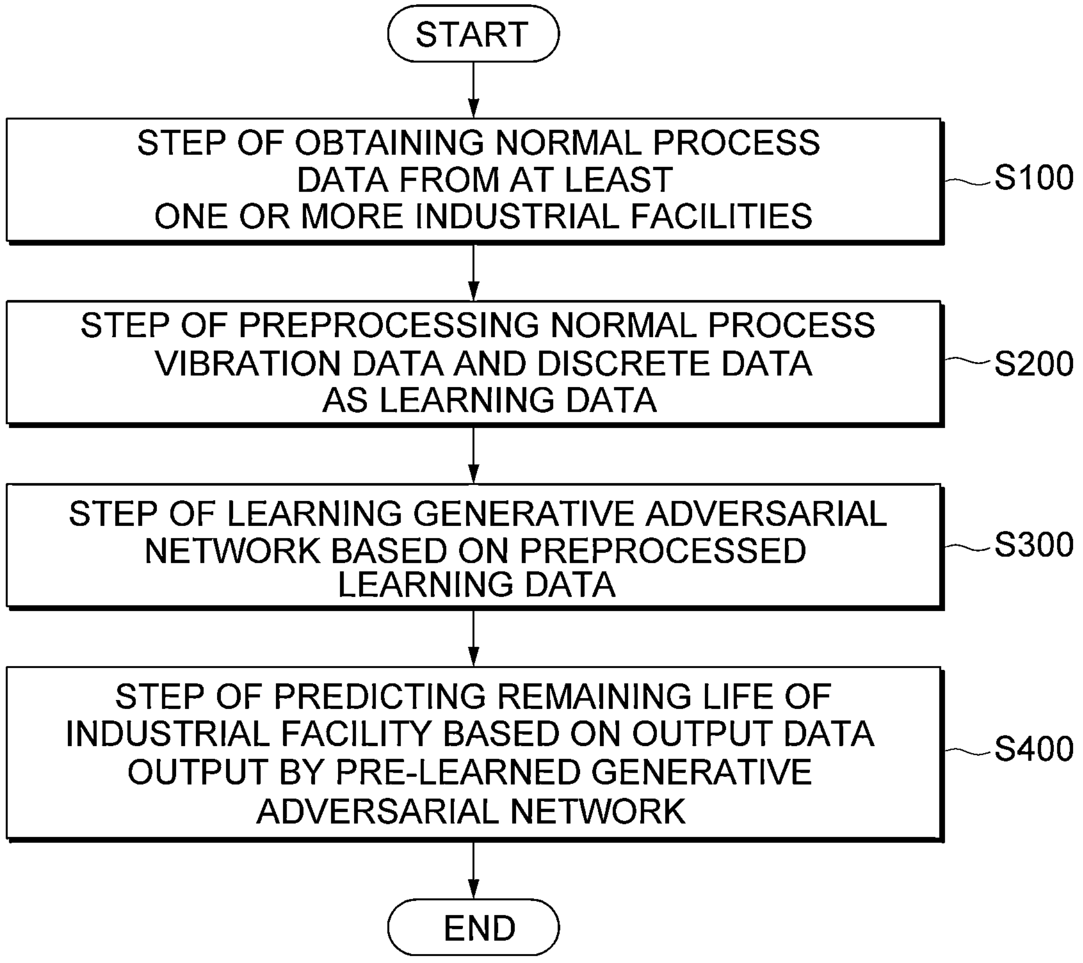
FIG. 2 is a flowchart illustrating a method of predicting a remaining life of an industrial facility that can be performed in the facility control device according to some embodiments of the present disclosure.

FIG. 2 is a flowchart illustrating a method of predicting the remaining life of the industrial facility that can be performed by the facility control device according to some embodiments of the present disclosure.

In Step S100, the facility control device 200 may obtain normal process vibration data from at least one or more industrial facilities 100. The normal process vibration data obtained from the facility control device 200 refers to data related to sound vibration generated from at least one or more industrial facilities 100. Accordingly, the normal process vibration data may be obtained for each industrial facility 100, and refers to vibration data related to sound generated while the industrial facility 100 is operated in each process.

The normal process vibration data may be data classified according to sound frequencies, or may be image data in which the vibration data is imaged. The facility control device 200 may acquire the normal process vibration data on a regular basis.

In addition, the normal process vibration data obtained from the facility control device 200 may refer to data obtained when the industrial facility 100 is normally operated without failure.

In Step S200, the facility control device 200 may preprocess normal process vibration data and discrete data as learning data.

The facility control device 200 may learn a generative adversarial network algorithm, which is a type of deep learning algorithm included in the facility control device 200, based on the normal process vibration data and the discrete data. In this case, as learning data, the facility control device 200 may utilize the normal process vibration data and discrete data. Here, discrete data means discrete data such as 1 or 0, and in the present disclosure, the discrete data may mean a process average pressing force in each industrial facility 100 or the number of times the industrial facility 100 is accumulated in a process.

Accordingly, the facility control device 200 may generate the learning data based on the normal process data and discrete data, and learn the deep learning algorithm included in the facility control device 200 based on the learning data. A detailed description of the preprocessing process will be detailed through FIGS. 4 and 5.

In Step S300, the facility control device 200 may learn the generative adversarial network based on the preprocessed learning data. In the present disclosure, the generative adversarial network included in the facility control device 200 is called GAN, which is an abbreviation for Generative Adversarial Networks. Therefore, the generative adversarial network is a type of deep learning algorithm.

GAN is a model that generates various fake data, such as images close to real or text written by a person. GAN is a model that learns two different networks in an adversarial manner and generates data similar to real data, and since the generated data does not have a set label value, GAN is classified as an unsupervised learning-based generative model.

GAN includes two different networks, a generator and a discriminator, and achieves the purpose by learning these two networks in an adversarial manner. The purpose of the generator (G) is to generate a fake distribution that is close to the true distribution, and the purpose of the discriminator (D) is to determine whether the sample belongs to the fake or true distribution. It is to generate data close to the "distribution of real data" of GAN including the two models, and thus, at a boundary (a value of 0.5 when fake and real are viewed as 0 and 1) where the discriminator cannot determine whether it is real or fake, it is considered an optimal solution that cannot distinguish fake samples from real samples.

The generator G is learned to produce data similar to real data, and discriminator D is learned to distinguish between real data and fake data generated by G. The objective function of GAN is the same as Equation 1, which is a game theory type objective function, and is the same as the method in which two players G and D fight each other to find a nash equilibrium point.

$$\min_G \max_D V(D, G) = \mathbb{E}_{x\sim p_{data}(x)}[\log D(x)] + \qquad \text{[Equation 1]}$$

-continued $$\mathbb{E}_{z\sim p_z(z)}[\log(1-D(G(z)))].$$

Here, the value of V(D,G) is derived as a probability value. First, when real data(x) is input from the viewpoint of D, as D(x) increases, the log value increases, resulting in a high probability value, and when input fake data (G(z)) is input, as the log value decreases, resulting in a low probability value. In other words, D is updated little by little to distinguish between the real data and the fake data created by G.

In G, samples are generated by passing noise z from a Zero-Mean Gaussian distribution through a multilayer perceptron, and when this generated fake data G(z) is input to D, it is learned to come out with a high probability like real data, the value of D (G(z)) is made high, and the overall probability value is made low, which means that G is updated little by little to produce data that 'D does not discriminate well'.

During actual learning, the two networks G and D may not be learned at the same time, but may be updated separately by updating the other network while fixing one network.

The facility control device 200 may learn the generative adversarial network with the learning data.

In Step S400, the facility control device 200 may input the input data to the pre-learned generative adversarial network and predict the remaining life of the industrial facility based on the output data.

When the facility control device 200 inputs the process vibration data obtained from the industrial facility 100 to the pre-learned generative adversarial network, it is possible to predict the remaining life of the industrial facility based on the output data output from the generative adversarial network.

In the present disclosure, the generative adversarial network, which is the deep learning algorithm, and a generator that generates the image of the normal vibration data from the normal process vibration data, which is the learning data, and the discriminator that discriminates the generator are learned in Step S300, and using the pre-learned generative adversarial network, it is possible to learn an encoder that maps stationary vibration data to the normal distribution. A detailed description of the encoder will be detailed through FIGS. 4 and 5.

In the facility control device 200, when the vibration data generated in the industrial facility 100 enters the encoder, it is mapped somewhat differently from the normal distribution, and since the generator will restore it as similar to normal as possible, a difference occurs between the input vibration data and the output data. Therefore, it is possible to predict the remaining life of the industrial facility 100 based on how much difference has occurred from normal by defining an Anomaly score as the difference between the input vibration data and the output data and utilizing the Anomaly score.

In this case, to explain a specific example of remaining life prediction, the input vibration data and the output data are imaging image data for each frequency of sound generated in the industrial facility 100, and referring to FIGS. 4 and 5 described in detail below, the image data means image data in which a certain data spot in a specific area at a specific frequency is displayed. In this case, the facility control device 200 may compare the input data and the output data and compares the average location difference where a certain data spot in a specific area is located, and determine that the remaining life is shorter as the average location becomes farther away. That is, the facility control device 200 may determine that the remaining life of the industrial facility 100 is longer as the input vibration data and output data are similar to each other in the image, and the remaining life of the industrial facility 100 is shorter as the input vibration data and output data are different to each other in the image. Hereinafter, another example of the remaining life prediction will be described with reference to FIG. 3.

Figure 3:
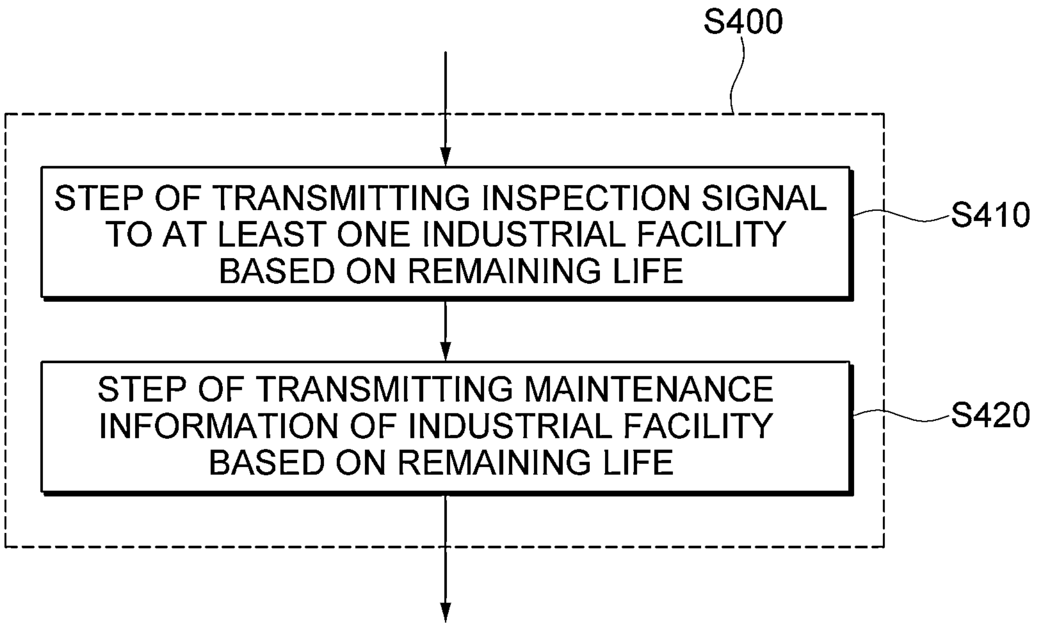
FIG. 3 is a flowchart for specifically explaining a step of predicting the remaining life based on output data output by a generative adversarial network according to some embodiments of the present disclosure.

FIG. 3 is a flowchart for specifically explaining a step of predicting the remaining life based on the output data output by the generative adversarial network according to some embodiments of the present disclosure.

In Step S410, the facility control device 200 may transmit an inspection signal to at least one industrial facility 100 based on the remaining life. The facility control device 200 may predict the remaining life, and, based on the predicted remaining life, transmit an inspection signal related to the industrial facility 100 for which the remaining life shorter than a critical remaining life is predicted. The facility control device 200 may transmit the signal to the industrial facility 100.

In addition, the facility control device 200 may differently set the period of transmitting the signal according to the remaining life. For example, the facility control device 200 may shorten the signal transmission cycle as the remaining life decreases, so that the inspection of the industrial facility 100 having a short remaining life can be quickly coped with.

In addition, the facility control device 200 may set the signal transmission period based on a difference value between the normal process data generated by a generator and the input data in the generative adversarial network including the facility control device 200. For example, the facility control device 200 may set the signal transmission period shorter as the difference between the input data and normal process data increases. Alternatively, the facility control device 200 may set the signal transmission period longer as the difference between input data and normal process data is shorter.

In Step S420, the facility control device 200 may transmit maintenance information of the industrial facility 100 based on the remaining life. The facility control device 200 may also transmit information about maintenance to the industrial facility 100 based on the predicted remaining life. Based on necessary maintenance information of the industrial facility 100 pre-stored in the facility control device 200, the facility control device 200 may transmit the maintenance-related information of the industrial facility 100 corresponding to the remaining life predicted by the industrial facility 100.

The maintenance-related information means information about manuals or maintenance-related information pre-stored for each industrial facility 100 in order to operate the industrial facility 100 normally in preparation for the case where the industrial facility 100 is outdated or broken.

Through this, the facility control device 200 can predict the remaining life of the industrial facility 100, cope with the remaining lift more quickly, and build a system capable of preparing for failure and inspection of the industrial facility 100.

Hereinafter, the specific architecture of the generative adversarial network included in the facility control device 200 will be described in detail with reference to FIGS. 4 and 5.

Figure 4:
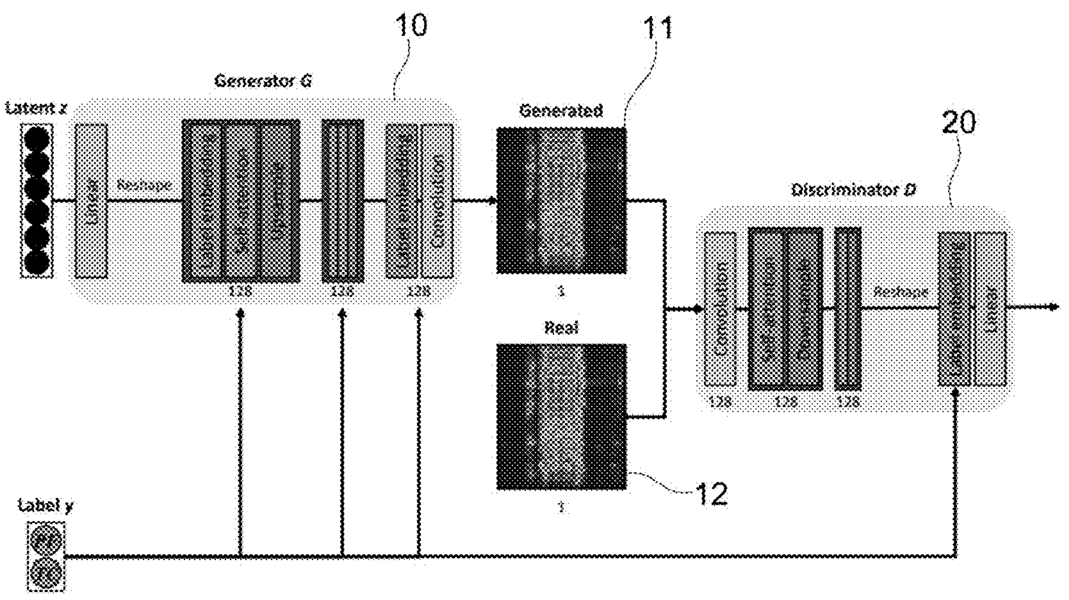
FIGS. 4 and 5 are diagrams of an exemplary architecture of the generative adversarial network in accordance with some embodiments of the present disclosure.
Figure 5:
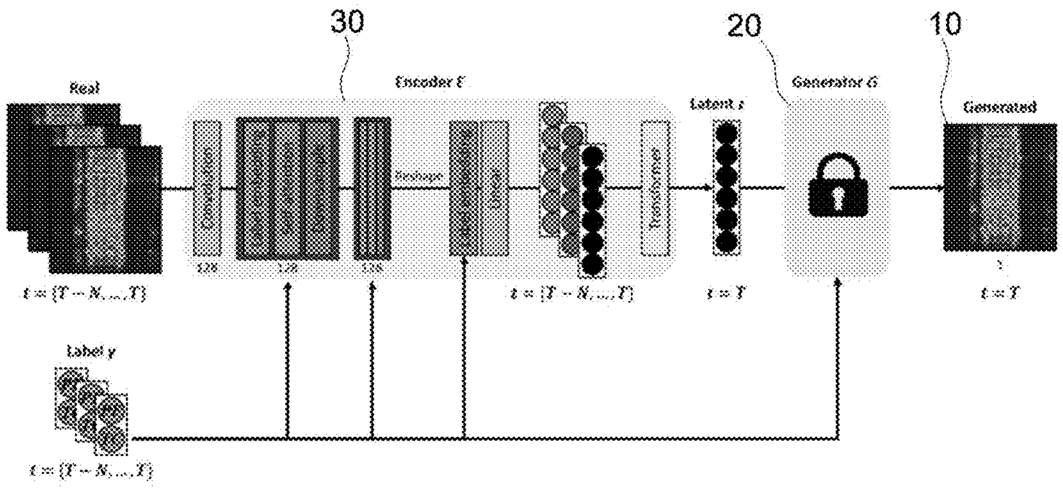

FIGS. 4 and 5 are diagrams of an exemplary architecture of the generative adversarial network in accordance with some embodiments of the present disclosure. The generative adversarial network included in the facility control device 200 may include the generator 10 as the generator and the discriminator 20 as the discriminator. In addition, the generative adversarial network can generate a generation image 11 and distinguish the difference from the learning data, which is the correct image 12, through a discriminator.

In this case, the generative adversarial network included in the facility control device 200 may include a label embedding layer in the generator 10 as the generator, and the label embedding layer may be a fully-connected layer that converts discrete data such as the average number of pressing forces and the number of uses of industrial facility into a weight to be multiplied to a feature map channel. In addition, the generative adversarial network can be learned using a soft-vicinal loss function, and since the generative adversarial network is learned using the normal process data and discrete data, which are time-series data, data having time-series meaning can be learned.

In FIG. 5, the encoder 30 may play a role of learning so that when normal process data is input, it can be mapped to a normal distribution, that is, normal process data. Therefore, when the input data is input, it can be mapped to create a difference from normal process data.

The encoder 30 may also include the label embedding layer, and in this case, discrete data such as the average number of pressing forces and the number of uses of industrial facility may be used for learning.

Through this, the facility control device 200 may learn the adversarial generation neural network, predict the remaining life of each industrial facility 100, and prepare for the remaining life.

Hereinafter, an apparatus in which various embodiments of the present disclosure may be implemented will be described in detail with reference to FIG. 6.

Figure 6:
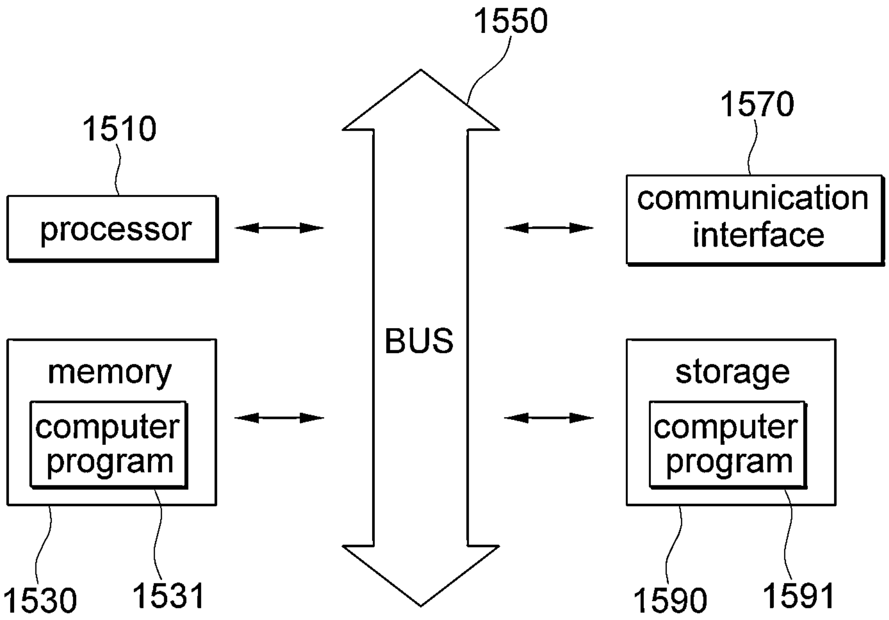
FIG. 6 is a diagram of an exemplary computing device in which an apparatus and/or system in accordance with various embodiments of the present disclosure may be implemented.

FIG. 6 is a diagram of an exemplary computing device in which an apparatus and/or system in accordance with various embodiments of the present disclosure may be implemented.

A computing device 1500 may include one or more processors 1510, a bus 1550, a communication interface 1570, a memory 1530 for loading a computer program 1591 executed by the processor 1510, and a storage 1590 for storing the computer program 1591. However, only components related to the embodiment of the present disclosure are illustrated in FIG. 6. Accordingly, those skilled in the art to which the present disclosure pertains can know that other general-purpose components may be further included in addition to the components illustrated in FIG. 6.

The processor 1510 controls the overall operation of each component of the computing device 1500. The processor 1510 may include a Central Processing Unit (CPU), a Micro Processor Unit (MPU), a Micro Controller Unit (MCU), a Graphic Processing Unit (GPU), or any type of processor well known in the art of the present disclosure. Moreover, the processor 1510 may perform an operation for at least one application or program for executing a method according to embodiments of the present disclosure. The computing device 1500 may include one or more processors.

The memory 1530 stores various data, commands and/or information. The memory 1530 may load one or more programs 1591 from the storage 1590 to execute a method according to embodiments of the present disclosure. The memory 1530 may be implemented as a volatile memory such as RAM, but the technical scope of the present disclosure is not limited thereto.

The bus 1550 provides a communication function between components of the computing device 1500. The bus 1550 may be implemented as various types of buses such as an address bus, a data bus, and a control bus.

The communication interface 1570 supports wired and wireless Internet communication of the computing device 1500. Moreover, the communication interface 1570 may support various communication methods other than internet communication. To this end, the communication interface 1570 may include a communication module well known in the art of the present disclosure.

According to some embodiments, the communication interface 1570 may be omitted.

The storage 1590 may non-temporarily store the one or more programs 1591 and various data.

The storage 1590 may include a non-volatile memory such as a read only memory (ROM), an erasable programmable ROM (EPROM), an electrically erasable programmable ROM (EEPROM), and a flash memory, a hard disk, a removable disk, or any form of computer-readable recording medium well known in the art to which the present disclosure pertains.

The computer program 1591 may include one or more instructions that, when loaded into the memory 1530, cause the processor 1510 to perform methods/operations according to various embodiments of the present disclosure. That is, the processor 1510 may perform methods/operations according to various embodiments of the present disclosure by executing the one or more instructions.

So far, various embodiments of the present disclosure and effects according to the embodiments have been described with reference to FIGS. 1 to 6. Effects according to the technical idea of the present disclosure are not limited to the effects mentioned above, and other effects not mentioned will be clearly understood by those skilled in the art from the description of the specification.

The technical idea of the present disclosure described with reference to FIGS. 1 to 6 so far may be implemented as computer readable code on a computer readable medium. The computer-readable recording medium may be, for example, a removable recording medium (CD, DVD, Blu-ray disc, USB storage device, removable hard disk) or a fixed recording medium (ROM, RAM, computer-equipped hard disk). The computer program recorded on the computer-readable recording medium may be transmitted to another computing device through a network such as the Internet, installed in the other computing device, and thus used in the other computing device.

In the above, even though all the components constituting the embodiments of the present disclosure have been described as being combined or operated as one, the technical idea of the present disclosure is not necessarily limited to these embodiments. That is, within the scope of the purpose of the present disclosure, all of the components may be selectively combined with one or more to operate.

Although actions are illustrated in a particular order in the drawings, it should not be understood that the actions must be performed in the specific order illustrated or in a sequential order, or that all illustrated actions must be performed to obtain a desired result. In certain circumstances, multitasking and parallel processing may be advantageous. Moreover, in the embodiments described above, the separation of the various components should not be understood as requiring such separation, and it should be understood that the described program components and systems may generally be integrated together into a single software product or packaged into multiple software products.

Although the embodiments of the present disclosure have been described with reference to the accompanying drawings, those skilled in the art to which the present disclosure pertains can understand that the present disclosure may be implemented in other specific forms without changing the technical spirit or essential characteristics thereof. Therefore, it should be understood that the embodiments described above are illustrative in all respects and not limiting. The protection scope of the present disclosure should be interpreted by the following claims, and all technical ideas within the equivalent range should be construed as being included in the scope of rights of the technical ideas defined by the present disclosure.

What is claimed is:

1. A method performed by a facility control device to predict a remaining life of an industrial facility using a generative adversarial network, the method comprising:

acquiring normal process vibration data, related to sound vibration generated from the industrial facility when the industrial facility is normally operated without failure and classified according to sound frequencies, from the industrial facility;

preprocessing and generating learning data using the normal process vibration data and discrete data, including an average number of pressing forces in the industrial facility and a number of accumulated uses of the industrial facility;

learning the generative adversarial network based on the preprocessed learning data; and inputting current vibration data obtained from the industrial facility into the learned generative adversarial network and predicting the remaining life of the industrial facility based on output data output from the generative adversarial network, wherein the current vibration data and the output data are image data for each of the sound frequencies generated in the industrial facility, the image data including a specific data spot in a specific area at a specific frequency.

2. The method of claim 1, wherein the generative adversarial network includes a generator that generates the current vibration data of the industrial facility.

3. The method of claim 2, wherein the generative adversarial network calculates a difference between the current vibration data generated by the generator and the learning data.

4. The method of claim 1, wherein the generative adversarial network includes a label embedding layer that converts a data value of the discrete data into a weight applied to a feature map channel.

5. The method of claim 2, wherein an inspection signal transmission period of the industrial facility is set based on a difference value between the normal process vibration data and the current vibration data generated by the generator in the generative adversarial network.

6. An apparatus for predicting a remaining life of an industrial facility using a generative adversarial network, the apparatus comprising:

a processor;

a network interface;

a memory;

a computer program loaded into the memory and executed by the processor, wherein the processor includes an instruction for obtaining normal process vibration data, related to sound vibration generated from the industrial facility when the industrial facility is normally operated without failure and classified according to sound frequencies, from the industrial facility, an instruction for preprocessing and generating learning data using the normal process vibration data and discrete data, including an average number of pressing forces in the industrial facility and a number of accumulated uses of the industrial facility, an instruction for learning the generative adversarial network based on the preprocessed learning data, and an instruction for inputting current vibration data obtained from the industrial facility into the learned generative adversarial network and predicting the remaining life of the industrial facility based on output data output from the generative adversarial network, wherein the current vibration data and the output data are image data for each of the sound frequencies generated in the industrial facility, the image data including a specific data spot in a specific area at a specific frequency.

7. The apparatus of claim 6, wherein the generative adversarial network includes a generator that generates the current vibration data of the industrial facility.

8. The apparatus of claim 7, wherein the generative adversarial network calculates a difference value between the current vibration data generated by the generator and the learning data.

9. The apparatus of claim 6, wherein the generative adversarial network includes a label embedding layer that converts a data value of the discrete data into a weight applied to a feature map channel.

10. The apparatus of claim 8, wherein an inspection signal transmission period of the industrial facility is set based on a difference value between the normal process vibration data and the current vibration data generated by the generator in the generative adversarial network.

11. An industrial facility remaining life prediction system, comprising:

at least one industrial facility configured to perform a certain industrial function in a production process; and a facility control device comprising a processor configured to acquire normal process vibration data, related to sound vibration generated from the at least one industrial facility when the at least one industrial facility is normally operated without failure and classified according to sound frequencies, from the at least one industrial facility; preprocess and generate learning data using the normal process vibration data and discrete data, including an average number of pressing forces in the at least one industrial facility and a number of accumulated uses of the at least one industrial facility; input current vibration data obtained from the at least one industrial facility into the learned generative adversarial network; and predict a remaining life of the at least one industrial facility based on output data output from the generative adversarial network, wherein the current vibration data and the output data are image data for each of the sound frequencies generated in the at least one industrial facility, the image data including a specific data spot in a specific area at a specific frequency.

12. The industrial facility remaining life prediction system of claim 11, wherein the generative adversarial network in the facility control device includes a generator that generates the current vibration data of the at least one industrial facility.

13. The industrial facility remaining life prediction system of claim 12, wherein the generative adversarial network calculates a difference between the current vibration data generated by the generator and the learning data.

14. The industrial facility remaining life prediction system of claim 11, wherein the generative adversarial network in the facility control device includes a label embedding layer that converts a data value of the discrete data into a weight applied to a feature map channel.

15. The industrial facility remaining life prediction system of claim 14, wherein an inspection signal transmission period of the at least one industrial facility is set based on a difference value between the normal process vibration data and the current vibration data generated by the generator in the generative adversarial network.

* * * * *